United States Patent [19]
Ott et al.

[11] Patent Number: 5,080,705
[45] Date of Patent: Jan. 14, 1992

[54] METHOD AND APPARATUS FOR MANUFACTURING PROFILED GLASS TUBING

[75] Inventors: Franz Ott; Reinhard Mannl, both of Mitterteich, Fed. Rep. of Germany

[73] Assignee: Schott Glaswerke, Mainz, Fed. Rep. of Germany

[21] Appl. No.: 706,712

[22] Filed: May 29, 1991

Related U.S. Application Data

[63] Continuation of Ser. No. 522,885, May 14, 1990, which is a continuation-in-part of Ser. No. 415,480, Oct. 2, 1989, abandoned, which is a continuation of Ser. No. 207,557, Jun. 16, 1988, abandoned.

[30] Foreign Application Priority Data

Jun. 20, 1987 [DE] Fed. Rep. of Germany ....... 3702526

[51] Int. Cl.$^5$ ............................................. C03B 15/14
[52] U.S. Cl. ......................................... 65/87; 65/187; 65/191
[58] Field of Search ........................................ 65/86–88, 65/187, 188, 190–192, 1

[56] References Cited

U.S. PATENT DOCUMENTS

| | | | |
|---|---|---|---|
| Re. 28,600 | 11/1975 | Lemelson | 65/86 X |
| 1,574,482 | 2/1926 | Hirsch | 65/86 |
| 1,653,848 | 12/1927 | Grotta | 65/187 X |
| 2,009,793 | 7/1935 | Sanchez-Vello | 65/86 X |
| 3,063,268 | 11/1982 | Knisely | 65/187 |
| 4,620,859 | 11/1986 | Lin et al. | 65/2 |

*Primary Examiner*—Robert L. Lindsay
*Attorney, Agent, or Firm*—Millen, White & Zelano

[57] ABSTRACT

Methods of an apparatus for producing profiled glass tubing utilizing the Danner process comprise flowing the molten glass over profiled blowpipe heads which are "super-profiled" in that the angles of ridges and grooves are more acute than the ridges and grooves resulting in the glass tubing. The particular profiles of the glass tubing are controlled by selecting the necessary drawing speed, viscosity of the glass, internal air pressure at the blowpipe head and throughput rate of the glass melt.

17 Claims, 8 Drawing Sheets

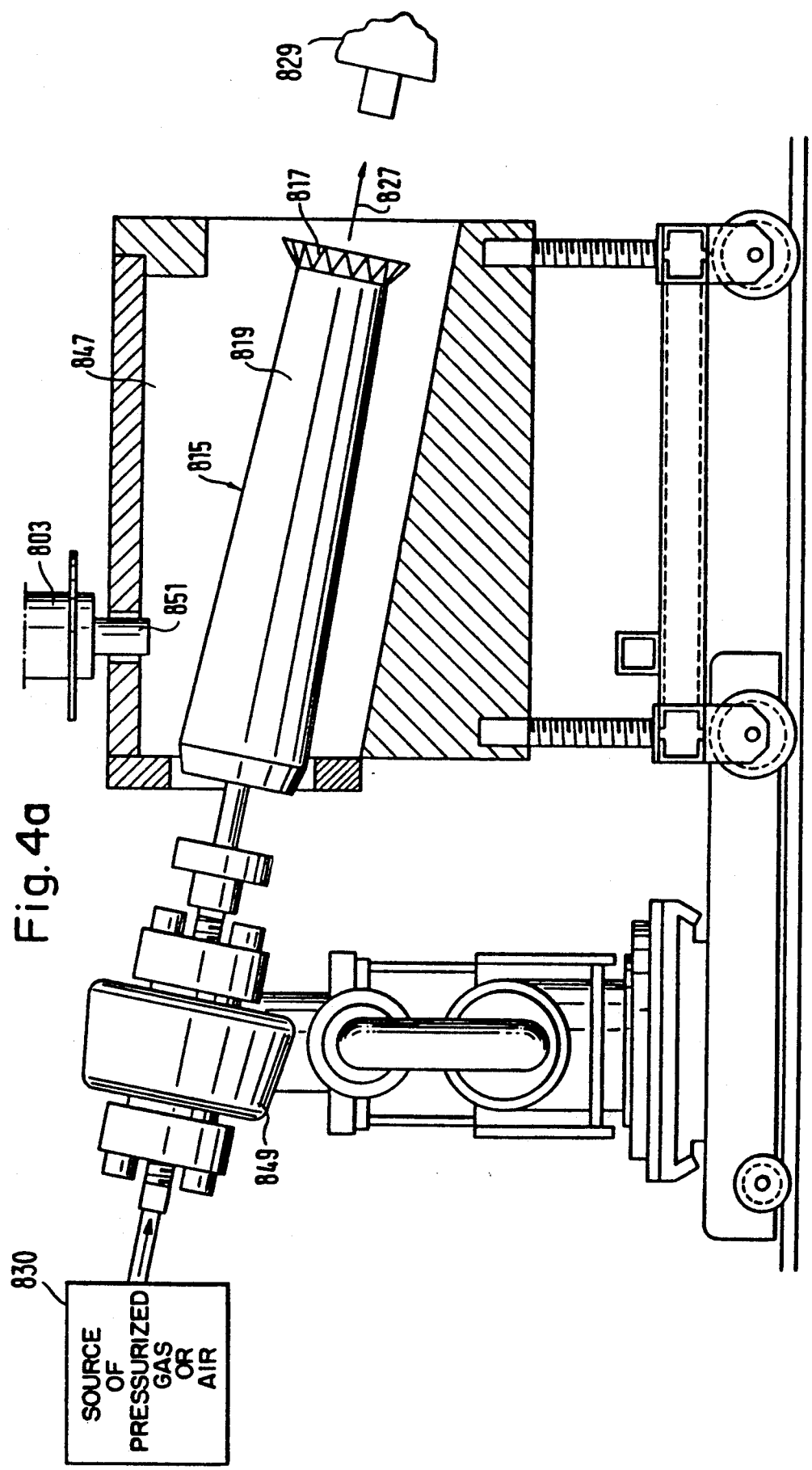

METHOD AND APPARATUS FOR MANUFACTURING PROFILED GLASS TUBING

CROSS-REFERENCE TO RELATED APPLICATION

This application is a continuation of allowed U.S. patent application Ser. No. 07/522,885, filed May 14, 1990, which is a continuation-in-part of U.S. patent application Ser. No. 07/415,480 filed on Oct. 2, 1989, now abandoned, which is a continuation of U.S. patent application Ser. No. 07/207,557, filed on June 16, 1988, now abandoned.

FIELD OF THE INVENTION

The invention relates to methods of and apparatus for manufacturing profiled glass tubing according to the Danner process.

BACKGROUND OF THE INVENTION

By means of various continuous tube drawing processes, the most popular of which are the Danner process, the Vello process, and the A drawing process, glass tubing has hitherto been produced with only a circular cross-section.

In the Danner process, molten glass which has been finished in a tank flows through a feeder channel to arrive through a nozzle on a mandrel usually formed by a ceramic cylinder, the mandrel being in a muffle furnace and comprising an axial passage. The mandrel is slightly inclined and rotates during the drawing process. The glass exiting from the nozzle is continuously wound onto the ceramic cylinder. Because of the slight inclination of the mandrel, the glass layer flows slowly towards a downstream mandrel head and is drawn off therefrom as a continuous tube by a drawing machine disposed at a certain distance. Air can be blown through the axial passage. By varying the air flow and the drawing velocity, as well as by changing the temperature in the muffle furnace, tubes of different diameters and wall thicknesses can be manufactured.

In the Vello process, the glass which has been finished in a tank flows through a feeder channel into a bowl, with the temperature being decrease so far that tubes or rods can be drawn from the bowl. The bowl has below an outflow ring with a circular opening. A downwardly enlarging needle is situated below or within that opening. The needle has a shaft which projects upwardly through the outflow ring and glass mass and is secured above the glass level in a needle holder so as to be displaceable, for purposes of precise centering, in all three spatial directions. Air can be blown through an axial passage of the needle. The glass flows with a tubular cross-section through the outflow ring and around the needle firstly downwards and then is deflected into the horizontal. At a certain distance, a drawing machine is disposed which draws the formed tubing continuously off. In accordance with changes of the temperature of the glass, the blowing air pressure, the mass flow and the drawing velocity, different dimensions of the tubing can be set.

The down drawing process corresponds to the Vello process, however, with the difference that the formed tubular glass is not deflected into the horizontal but, rather, is drawn vertically downwards. The drawing temperatures are somewhat lower than with the Vello process. With this process, larger tubing can be manufactured than with the Vello process.

Hirsch U.S. Pat. No. 1,574,842 describes such a process which, however, is not workable in the described manner. Therefore, the process was never used.

A manufacture of tubing the wall of which comprises a profile of some kind has not yet been carried out according to the aforementioned processes because prejudices existed among skilled people with respect to the practicability, as can be seen for instance from the printed publications Sprechsaal 114, Vol. 5/81, pp. 340-343; Glastechn. Ber. 54 (1981), No. 5, pp. 131-135; Journal of Non-crystalline Solids 7 (1972), pp. 203-220; and Journal of Non-Crystalline Solids 6 (1971), pp. 377-388, by E. Roeder and E. Roeder et al., respectively.

In these printed publications, it is set forth in connection with an extrusion process which is described there, that for producing sharp-edged profiles, a lowering of the working temperature and thus a high viscosity is necessary. As stated there, a rounding of edges would result from the surface tension in the conventional continuous tube drawing processes due to their substantially higher working temperatures and thus lower viscosities of the glass.

As further prejudices, it is believed that the glass would not flow through narrow gaps due to its high viscosity, that plane surfaces would not be obtainable, and that the profile would not reproducible. Moreover, it was believed that narrow tolerances could be achieved only by redrawing, calibrating or shrinking.

In the manufacture of profiled glass tubing, a success was achieved only with the extrusion process as known from the German disclosure letter 35 16 920. By application of a combined extrusion and drawing-through process, fiber-reinforced rods and solid profiles of inorganic glasses were manufactured, or of glasses which can be transferred into a glass ceramic with a core zone thereof being reinforced by continuous fibers.

As can be derived from Sprechsaal 114, Vol. 5/81, pp. 340-343; Glastechn. Ber. 54 (1981), No. 5, pp. 131-135, Journal of Non-Crystalline Solids 7 (1972), pp. 202-220; and Journal of Non-Crystalline Solids (1971), pp. 377-388, by E. Roeder and E. Roeder et al., respectively, also tubing of any desired inner and outer profiles can be produced with this extrusion process. However, that process suffers from the disadvantages that only shaped parts of restricted dimensions can be manufactured, and that the process is too expensive, from a cost standpoint, due to the necessary high pressures, to achieve importance beyond an application in special fields, for mass production.

OBJECT OF THE INVENTION

It is the object of the present invention to provide a process and a device by which tubing with interior and both, interior and exterior, profiles can be mass-produced in a simple manner and at minimal expense.

SUMMARY OF THE INVENTION

The object is attained with a process and a device according to the claims.

Upon further study of the specification and appended claims, further objects and advantages of this invention will become apparent to those skilled in the art.

The instant invention utilizes a superprofile approach. A superprofiled profile is an exaggerated profile in view of the angles and dimensions in the desired glass tubing. The angles of the superprofiled shaped bodies according to the present invention are more acute than the angles in the desired glass tubing.

The initially described Danner process can be employed with a profiled shaped body being arranged in the interior of the tubing being formed. The glass is homogenized with a stirrer in a part of a feeder in which the viscosity of the glass is still below 2,000 Poise. The glass which in this manner has been thermally and chemically homogenized is fed through a feeder channel to the bowl while the temperature is lowered so that the glass exhibits in the bowl a viscosity suitable for the drawing of profiled tubing.

The tube drawing process is performed within a viscosity range which is characteristic for the particular process. This viscosity range is in the order of about $4 \cdot 10^5$ to about $10^6$ Poise. Outside of this viscosity range, a drawing process cannot be performed which is based on a free shaping as in the Danner process.

While this viscosity range can be employed in the drawing of profiled tubing, particular attention must be paid to the choice of the viscosity because of its strong influence to the forming of the profile. This was one of the surprising findings in the first profile drawing experiments. In order to obtain a definite forming of the profile with a predetermined tool, only a narrow viscosity range can be employed. In order to obtain a sharply formed profile, the viscosity in the shaping area must be increased. In order to obtain with the same tool a weakly shaped, radiused profile, one has to work in a range of lower viscosity. In this property resides the essential difference from the usual drawing processes for round tubing where that effect is not striking and moreover is of no concern.

Besides the viscosity of the glass, the parameters interior pressure, glass mass flow, drawing speed, and dimensions of the shaping tools are decisive, it being necessary to adjust all parameters correspondingly to each other. The tube diameter and the wall thickness can be selected independently of each other. The drawing speed is correlated, on the basis of the law of continuity, with the glass mass flow for a predetermined tube dimension (outer diameter and wall thickness).

Surprisingly, it has been found that in contrast to the prejudices, tubing with a sharp-edged profile can be manufactured with a corresponding adjustment of the parameters, with an edge radius of as low as 0.1 mm being achievable. The expected strong radiusing because of the surface tension does not occur. Also radiusing can be counteracted by a more or less exaggerated contour of the shaped body. Also, the dimensional precision of the profiled tubing surprisingly is as good as with that of the usual round tubes.

DANNER PROCESS

If the Danner process is employed in accordance with the invention, the viscosity of the glass is adjusted to be 2 to $4 \cdot 10^3$ Poise at the outflow from the nozzle. While the glass flows over the mandrel, the viscosity is increased by wy of the temperature gradient set in the muffle furnace so that at the mandrel head where the tube is formed from a so-called drawing onion, a viscosity of 4 to $10 \cdot 10^5$ Poise is present in the outer skin, depending on the diameter and the wall thickness of the tube to be manufactured.

The precise value of the viscosity of the glass during the shaping is dependent upon the tube dimension which shall be manufactured (tubes having out diameters of 1 to 100 mm and wall thicknesses of 0.2 to 10 mm can be drawn), the temperature in the muffle furnace, the kind of glass, the mass flow, and the dimensions of the drawing tool.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

In the foregoing and in the following examples, all temperatures are set forth uncorrected in degrees Celsius and unless otherwise indicated, all parts and percentages are by weight.

The entire disclosures of all applications, patents and publications, if any, cited above and below, and of corresponding application Federal Republic of Germany P 37 20 526.9, filed June 20, 1987, are hereby incorporated by reference.

EXAMPLE

EXAMPLE 1

By means of the Danner process and a profile mandrel head, tubes were drawn from lime-soda glass which were exteriorly round and had an interior profile (the profile being undulatory, in cross-section, with twelve waves):

TABLE 1

| | | | | |
|---|---|---|---|---|
| Outer diameter of the profiled tube (mm): | 9.25 | 11.25 | 19.00 | 22.00 |
| Mean wall thickness of the tube (mm): | 0.65 | 0.65 | 0.80 | 1.10 |
| glass mass flow (kg/h): | 280 | 280 | 280 | 280 |
| blowing air pressure (mbar): | 0.6 | 0.7 | 1.1 | 1.2 |
| $r_R$ (mm): | 1.0 | 1.25 | 2.75 | 3.25 |
| $r_Z$ (mm): | 1.0 | 1.25 | 2.75 | 3.25 |
| drawing velocity (m/s): | 1.76 | 1.43 | 0.67 | 0.43 |

$r_R$ is the radius of curvature of the grooves of the interior profile of the tube, $r_Z$ is the radius of curvature of the interiorly projecting crest of the undulatory profile.

| | |
|---|---|
| diameter of mandrel head: | 200 mm |
| range of dimension: | 10–40 mm |
| blowing air pressure: | 0.5–10 mbar |
| viscosity in the drawing onion: | $4$–$10 \cdot 10^5$ Poise |
| temperature in the drawing onion: | 810–850° C. |

As shown by this example, it is also possible, with one and the same shaped body, to change the tube diameter by an appropriate selection of the parameters, with the contour of the profile, however, becoming less sharp as the tube diameter increases.

The device according to the invention is characterized in that a mandrel head in a tube drawing system according to Danner comprises in its surface grooves and webs of any desired number, which can be designed in any desired, even asymmetrical, shapes.

In the tube drawing system utilizing the Danner process, these grooves and webs of the mandrel head are helical or parallel with respect to the drawing direction.

Preferably, the mandrel head consists of heat-resistance steel. The crest surfaces of the webs of the profiled mandrel head may be cylindrical or conically tapering or enlarging in the drawing direction. The bottom surfaces of the grooves of the mandrel head may be cylindrical or conically tapering or enlarging in the drawing direction. The strongest profiling is achieved with a conically enlarging mandrel head. In the common Danner process, conically tapering mandrel heads are employed but only for the manufacture of round tubes.

According to a further embodiment, the shaping section of the mandrel head has a pillow-shaped contour in cross-section.

In the case of interiorly profiled tubes manufactured in accordance with the Danner process, the grooves and webs of the tube always extend in a helical line, due to the rotation of the mandrel. Depending upon the sense of rotation of the mandrel, the helix may have a left-hand or a right-hand sense. The pitch of the helix is dependent on the glass mass flow and the drawing speed.

In accordance with the invention, the profile may be provided on the interior side of the tube (so-called interior profile) and also on the exterior side of the tube (so-called outer profile), depending upon the product which shall finally be produced from the profiled tube.

For flasks and ampullae produced from these tubes, an interior profiling is particularly advantageous because this permits to achieve optical effects although the outer surface is smooth. This is of importance where an attractive appearance of a package is desired. The smooth outer surface can be easily cleaned and printed. A filled-in medium can be recognized more clearly. A particular advantage consists in that interiorly profiled flasks and ampullae can be worked on conventional flask machines. Moreover, flasks made from interiorly profiled tubing have a substantially smaller weight than conventional press-molded profiled flasks because wall thicknesses as small as 1 mm are possible. In the case of laboratory ampullae, the interior profile improves the intermixing in mixing processes in which the ampulla is moved. Moreover, the larger active interior surface promotes processes like heat exchange, light radiation reproduction of cell cultures, or heating.

In the case of neon and fluorescent lamps made from interiorly and exteriorly profiled tubings, a variety of optical effects can be achieved due to the light reflection caused by the profile, whereby the tube may simultaneously serve decorative purposes. At the same time, the use of tubing with an interior profile results, due to the increased ratio between the interior, coated surface and the gas volume, in an increased light yield and thus an increased ratio of emitted light to consumed electrically energy, e.g., a higher efficiency than in the case of the usual smooth tubes.

Tubes which only have an interior profile have the same structural dimensions as conventional neon or fluorescent lamps and thus can be installed without problems in the sockets used hitherto. These tubes can be easily cleaned because of their smooth outer surface, but yet exhibit the aforesaid advantages.

In the case of heat exchanges for air, water, or generally gas and liquid, the use of glass tubing with an exterior and/or interior profile permits a considerable reduction of the structural length (structural size) with the same efficiency. With circular heat exchanger cross-sections, the efficiency of the heat exchanger is limited by the bad heat transition on the gas side. By the profiling, the surface is increased, whereby the amount of heat withdrawn from the gas is substantially increased. In this manner, the heat-exchanging surface may even be doubled; moreover, an additional whirling will result in an improved heat transition.

The glass tubing which is suitable for the aforesaid exemplary applications preferably comprises an undercut profile or a profile which is star- or wave-shaped in cross-section; the said profiles may be outer or inner profiles. "Star-shaped" profile also means that the longitudinal grooves which form these profiles have sharp edges.

Preferably for heat exchanger tubing, the exterior and interior profiles may be combined and designed so that the wall thickness of the tube is constant over the circumference of the tube.

Particularly with a view to further process of the tubes to form perfume flasks, the exterior and interior profiles also may be combined and designed so that the wall thickness of the tube varies along the circumference of the tube, for instance if the outer profile is complementary with the inner profile.

BRIEF DESCRIPTION OF THE DRAWINGS

Various other objects, features and attendant advantages of the present invention will be more fully appreciated as the same becomes better understood when considered in conjunction with the accompanying drawings, in which like reference characters designate the same or similar parts throughout the several views, and wherein:

FIGS. 3b to 3g are cross-sectional views of tubes which have been manufactured with the mandrel head shown in FIG. 3a;

FIG. 4 is a longitudinal section through a Danner drawing system according to the invention;

DETAILED DESCRIPTION OF THE DRAWINGS

Figure 1:
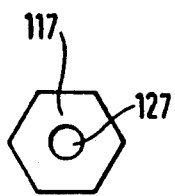
FIG. 1 is a diagrammatic bottom view of a mandrel head.

Referred now to FIG. 1, a shaping section 117 of a mandrel head has in cross-section the shape of a polygon with n=6 corners. Accordingly, molten glass flowing over the mandrel head is provided with a hexagonal interior profile, whereby a solidified tubing results which has interior grooves extending helically in the tubing due to rotation of the blowpipe upon which the shaping section 117 is mounted (see FIG. 4A).

Figure 2A:
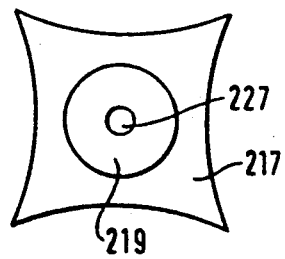
FIG. 2a is a cross-section of another mandrel head.

The bottom end view of the mandrel head in FIG. 2a shows a pillow-like shape for a shaping section 217 which is suitable for the production of tubes with a square cross-section. The angle of the edges of the shaped bodied 215 are selected to be about 55°. Through an axial passage 227, air is blown into the tube being formed as the shaping section 217 rotates with the blowpipe upon which it is mounted (see FIG. 4a).

Figure 2B:
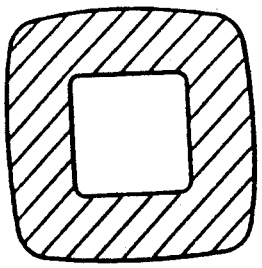
FIGS. 2b, 2c and 2d are cross-section views of tubes which have been produced with the mandrel head shown in FIG. 29.
Figure 2C:
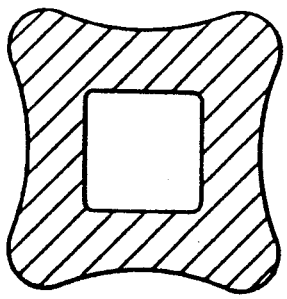
Figure 2D:
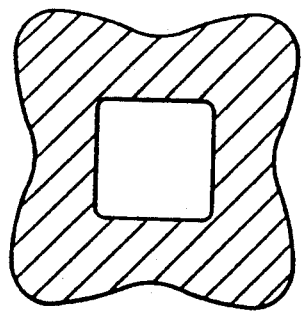

Various cross-sections of tubing produced with the needle 217 of FIG. 2a are illustrated at a scale 5:1 in FIGS. 2b, 2c and 2d. The edge radius on the interior side of the tube is 0.3 mm.

Figure 3A:
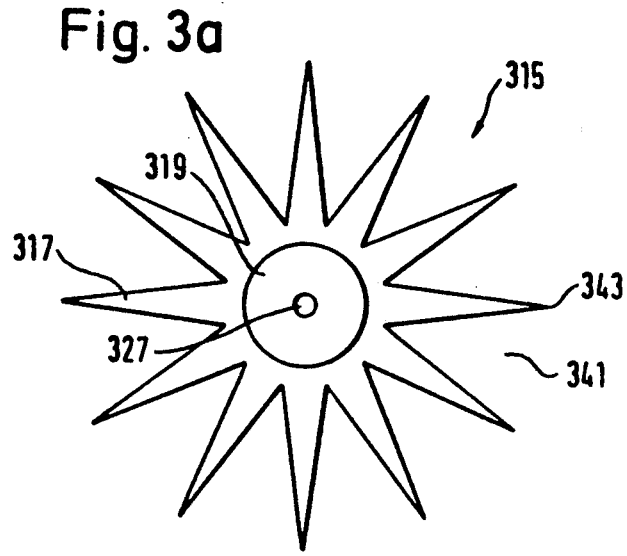
FIG. 3a is a plane view of another mandrel head.
Figure 3B:
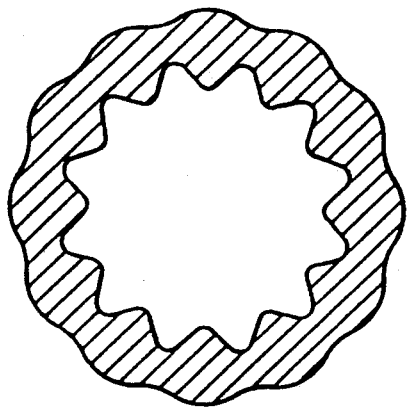
Figure 3C:
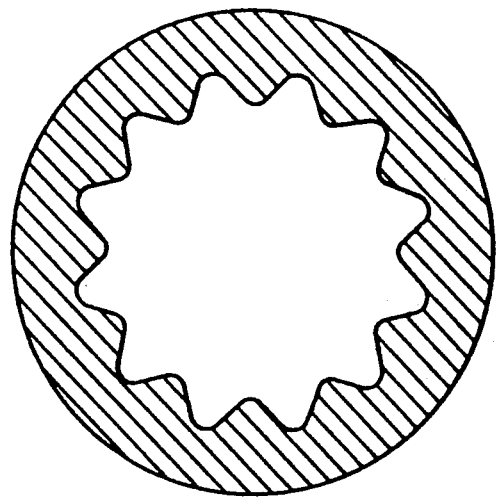
Figure 3D:
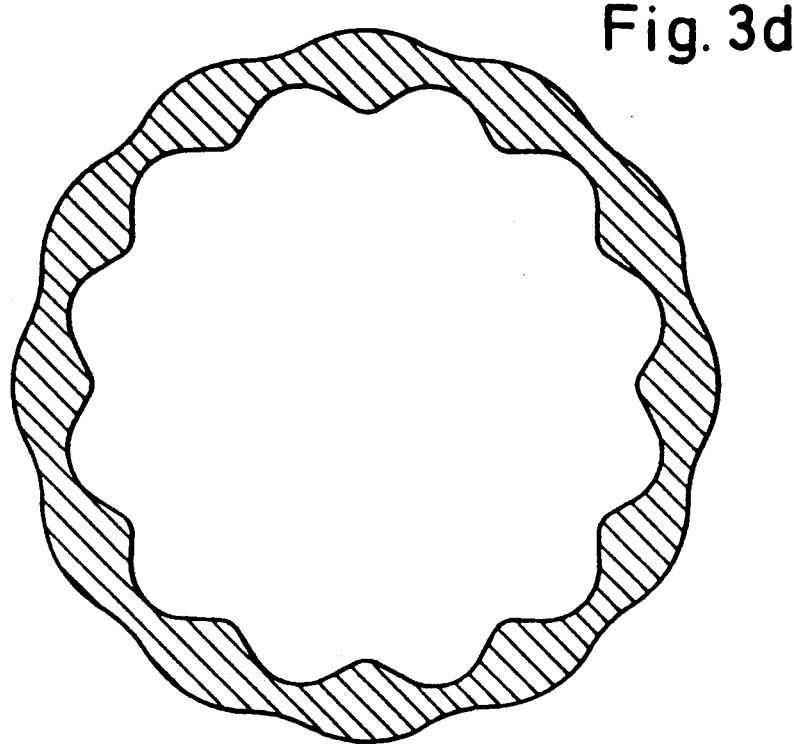
Figure 3E:
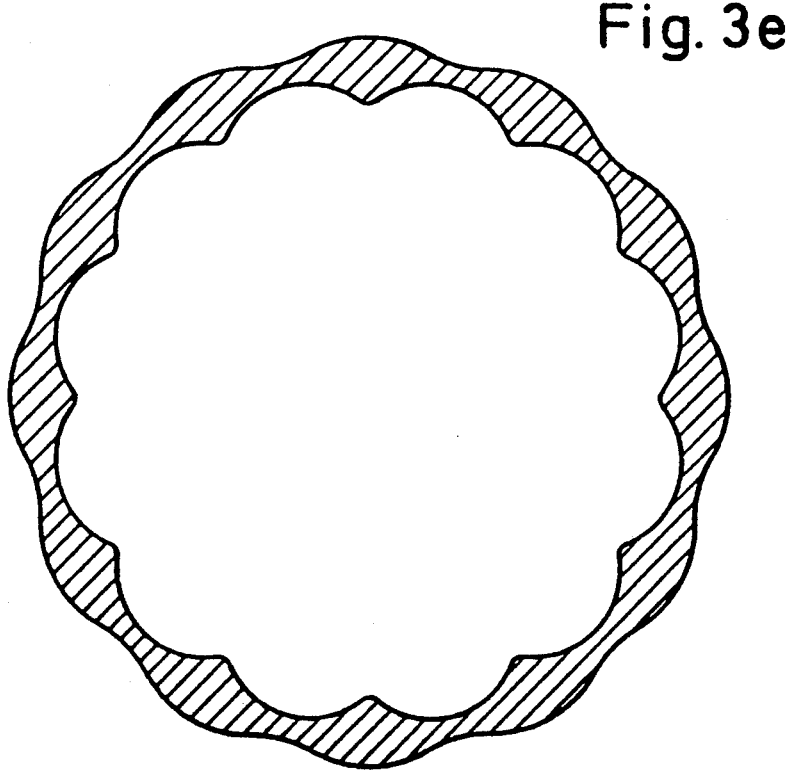

In FIG. 3a, which is a bottom view of another mandrel head 315, grooves 341 and webs 343 of the shaping section 317 can be seen, which give the mandrel head a star-shaped configuration.

FIGS. 3b to 3e show, at a scale of 5:1, the glass profiles produced with the mandrel head 315. An increase of the tube diameter is achieved by increasing the blowing air pressure. An increasing of the resulting angles in the inner cross-section is achieved by decreasing the thickness of the tube wall. Decreasing of the thickness of the tube wall causes a flattening and a smoothing off of the angles in the inner cross-section.

With all tube cross-sections, a wave or star-shaped interior profile can be clearly seen. An analogous outer profile was obtained in the case of thin tube wall so that the thin areas have become thinner, and the thick areas have become thickener.

Figure 3F:
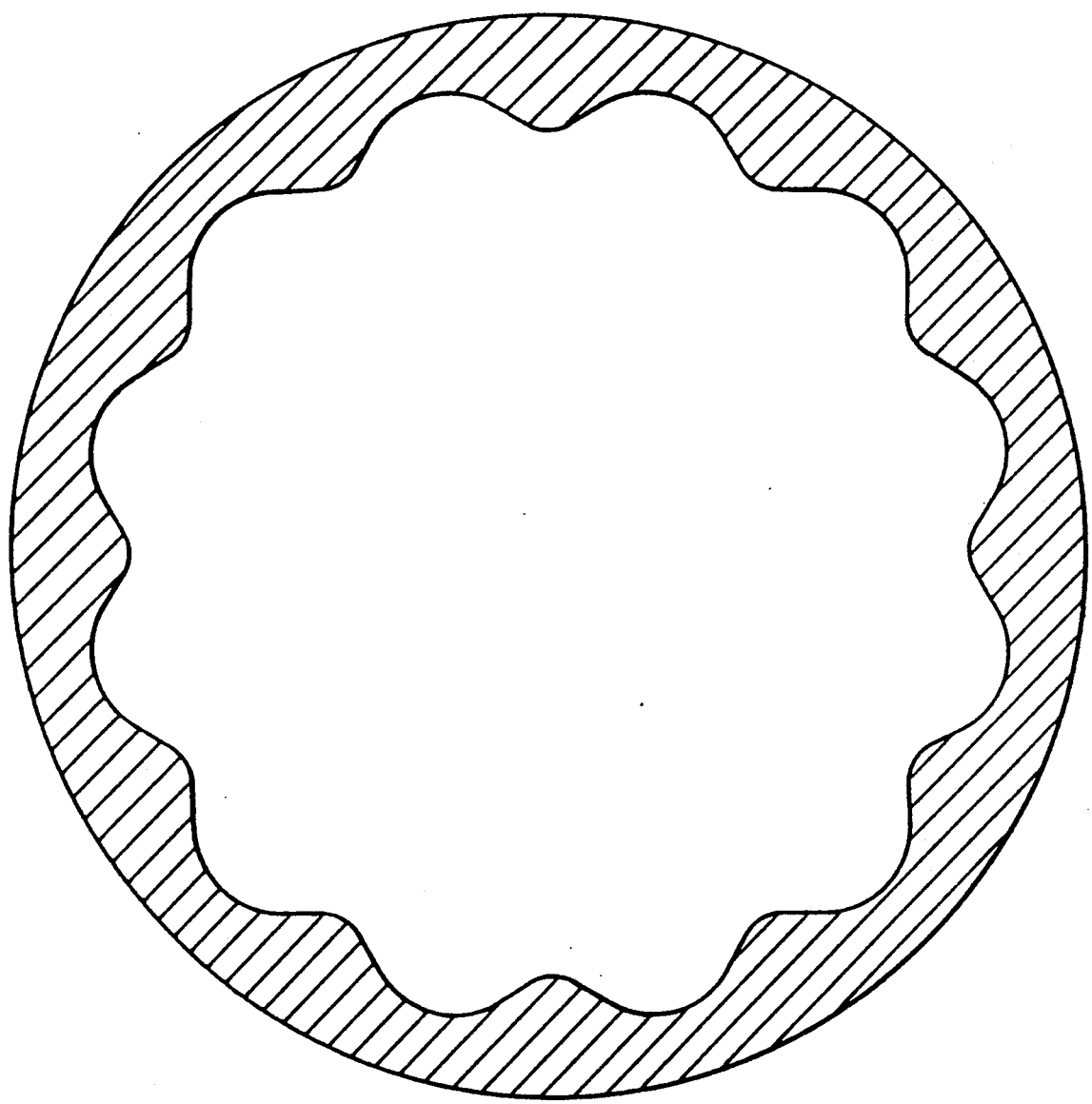
Figure 3G:
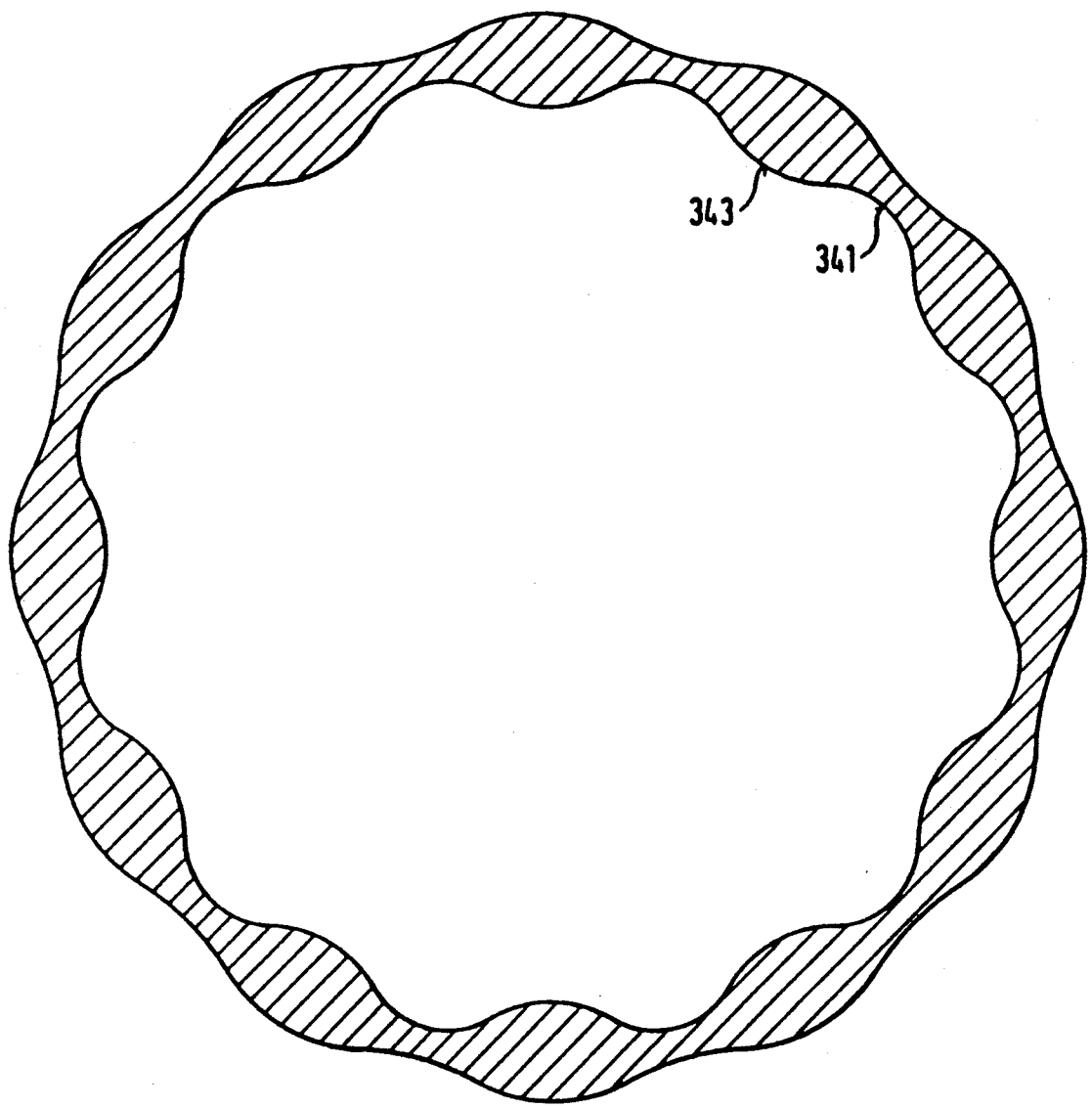

FIGS. 3f and 3g show two tube profiles which also have been produced with the mandrel head shown in FIGS. 3a. With thick-walled tubes, the outer surface remains smooth. Although the tubes shown in FIGS. 3f to 3g have been produced with the same mandrel head, not only the diameter and the wall thickness of the tubes, but also the shaping of the profile can be influenced by a suitable selection of the glass temperature, the glass mass flow, the blowing air pressure, and the drawing speed.

The radiuses $r_R$ of the grooves 341 and the radiuses $r_2$ of the interiorly pointing crests 343 of the interior profile in the FIGS. 3b to 3g are as follows:

TABLE 4

| FIG. | $r_R$ (mm) | $r_Z$ (mm) | outer diam | inner diameter in | inner diameter in |
|---|---|---|---|---|---|
| 3b | 0.4 | 0.3 | 12.0 | 0.9 | 7.2 |
| 3c | 0.5 | 0.35 | 15.2 | 11.3 | 9.2 |
| 3d | 1.5 | 0.55 | 19.5 | 16.8 | 15.0 |
| 3e | 2.5 | 0.4 | 19.5 | 16.8 | 16.0 |
| 3f | 2.5 | 0.7 | 32.0 | 26.8 | 24.0 |
| 3g | 2.5 | 0.5 | 31.5 | 28.5 | 26.5 |

The sharp-edged star-shaped inner profile was achieved by a high glass viscosity with a small glass mass flow.

FIG. 4a shows a Danner drawing system in a longitudinal vertical section. A shaped body 815 is provided in the form of a Danner mandrel or blowpipe having a mandrel head or profiled blowpipe head 817 and a shaft 819. The mandrel is disposed in a gas-fired muffle furnace 847 which is heated to maintain the viscosity of the molten glass in the range of about 4.10 Poise to about $10 \cdot 10^5$ Poise and is rotated by a mandrel drive machine 849. From a nozzle 851, molten glass flows from a feeder channel 803 onto the mandrel. The solidifying glass tube is taken up by a drawing machine (schematically illustrated at 829) spaced a selected distance (not drawn to scale) downstream of the profiled blowpipe head 817. The selected distance is readily determined by one skilled in the art.

Figure 4C:
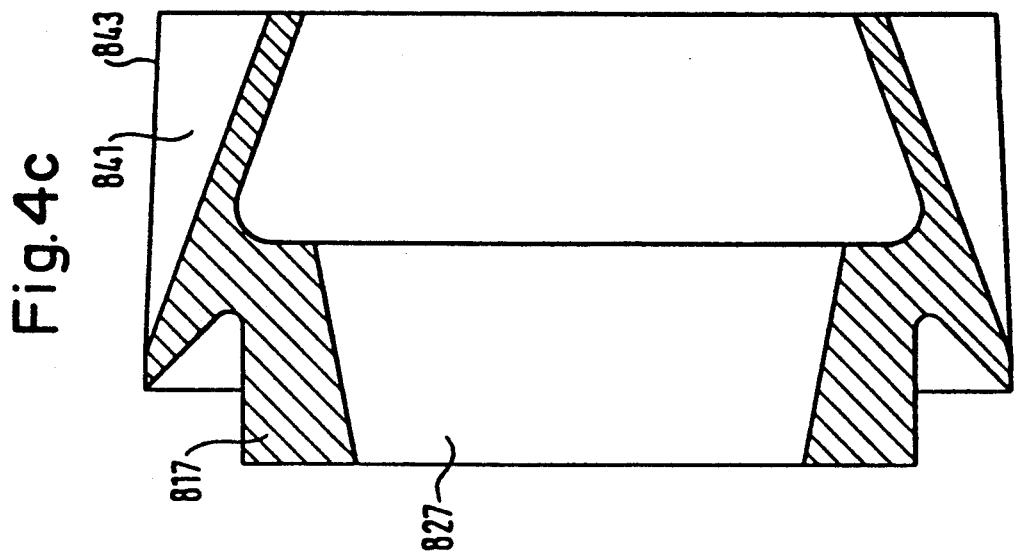
FIGS. 4b and 4c are plane view and a longitudinal section of a profiled mandrel head.
Figure 4B:
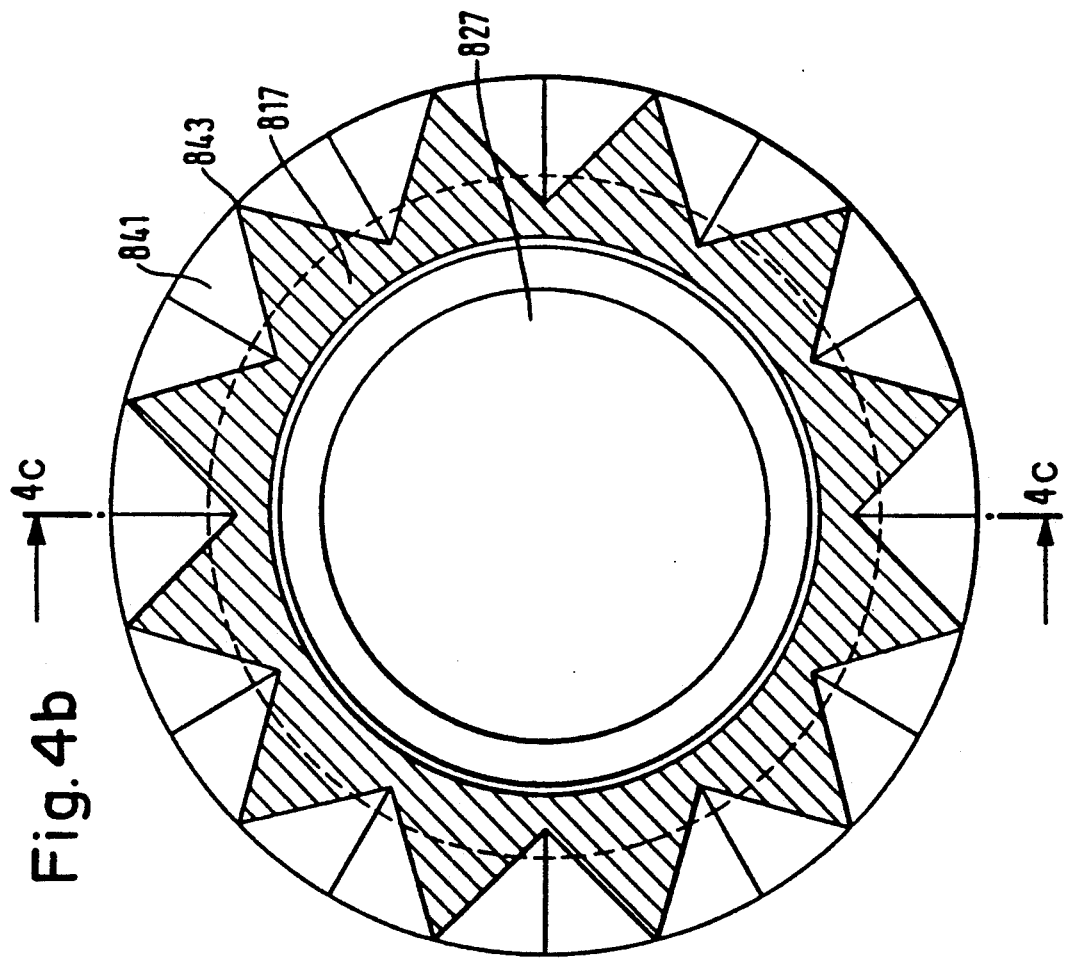

FIG. 4b shows a plane view of the mandrel heat 817 which is designed star-shaped and comprises sharp grooves 841 and shape webs 843. FIG. 4c shows a section along the line 4c—4c of FIG. 4b. The grooves 841 taper conically in the drawing direction (in FIG. 4c to the right), whereas the webs 843 are designed cylindrically. Through passage 827, air is blown in the tube being formed from a source of pressurized air 830 (FIG. 4a). In the preferred embodiment of the invention, the diameter of the mandrel heat 817 is substantially greater, about 5 to 10 times larger than the diameter of the glass tube with the viscosity of the glass at the mandrel head being maintained in the range of $4 \cdot 10^5$ Poise to $10 \cdot 10^5$ Poise.

Figure 5B:
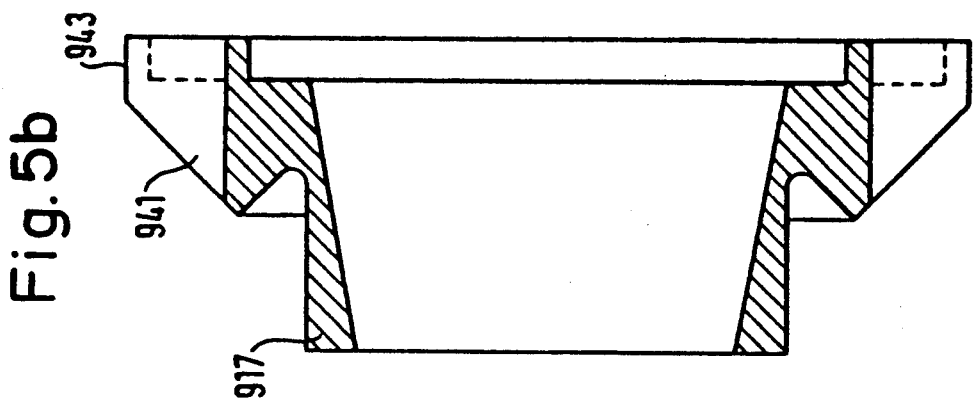
FIGS. 5a and 5b are a plane view and a longitudinal section of a profiled mandrel head according to a further embodiment.
Figure 5A:
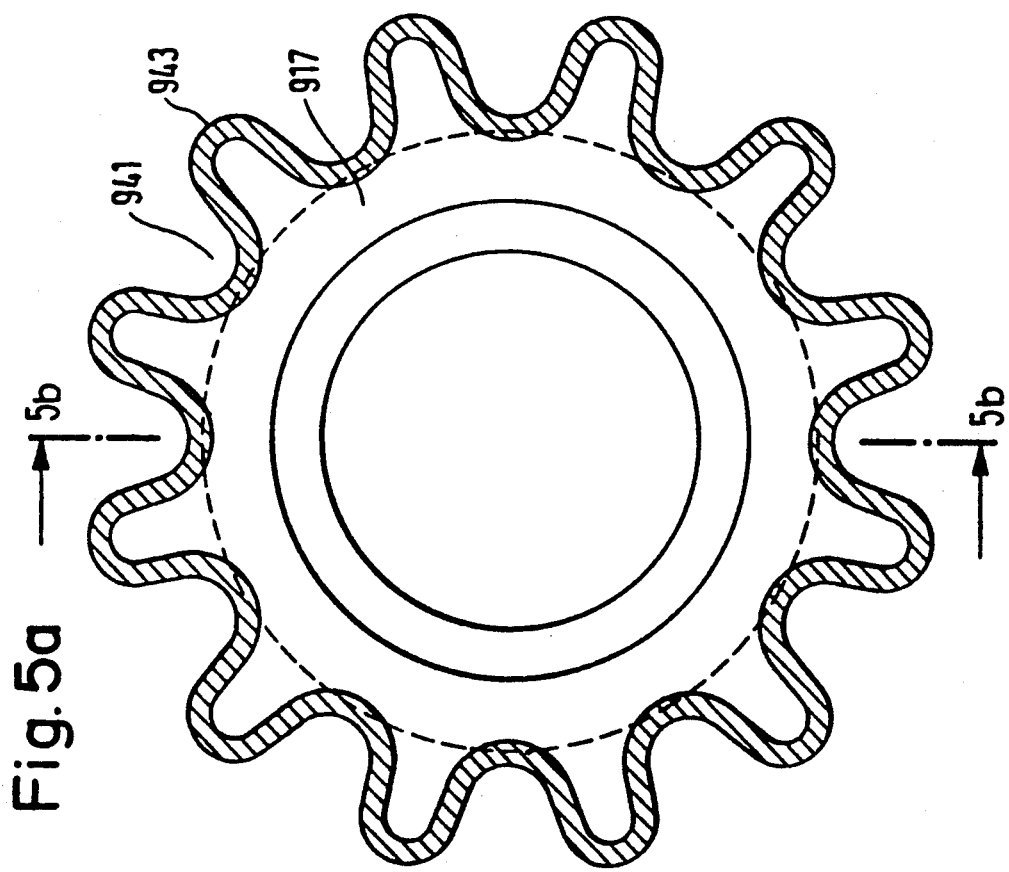

FIG. 5a shows a plane view of a wave-shaped profiled mandrel or blowpipe head 917 in which the grooves 941 and webs 943 are radiused.

In FIG. 5b, a section along the line 5b—5b of FIG. 5a can be seen. The grooves 941 are cylindrically, and the webs 943 are designed to enlarge conically in the drawing direction (in FIG. 5b to the right).

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A continuous process for making a solid glass tube comprising the steps of:

melting glass to form a molten glass mass;

supplying the molten glass mass to surround an outer surface of a rotating, round, barrel portion of a blowpipe with a tubular glass stream having an outer skin and inner surface;

drawing the glass stream into a molten glass tube by drawing the glass stream over the rotating blowpipe while the blowpipe is oriented obliquely with respect to a horizontal orientation;

expanding the diameter of the tubular glass stream at a profiled head portion of the blowpipe as the tubular glass stream flows thereover, the profiled head being at a lower end of the blowpipe and having a length greater than 10% of the length of the barrel portion of the blowpipe;

maintaining the viscosity of the outer skin of the tubular glass stream in a range of about $4-10^5$ Poise to about $10 \cdot 10^5$ Poise as the tubular glass stream flows over the blowpipe;

maintaining a pressure within the blowpipe sufficient to apply a pressure at an exit of the blowpipe proximate the profiled head portion thereof which exceeds the pressure on the outer skin of the molten glass tube;

adjusting the desired profile of the solid glass tube resulting from cooling the molten glass tube to a desired sharpness of contour and diameter by variation of at least one of the following parameters before cooling the molten glass tube: drawing speed, viscosity of the glass, internal gas pressure at the exist proximate the profiled head and throughput rate of the molten glass mass; and allowing the molten glass tube to cool into the resulting solid glass tube.

2. The process according to claim 1, wherein the ratio of the length of blowpipe surrounded by the molten glass tube to length of the profiled zone of the blowpipe head surrounded by the molten glass tube is in the range of about 30:1 to about 50:1.

3. The process according to claim 1, wherein for producing a profiled glass tube of lime-soda glass with a diameter of 3–40 mm and a wall thickness of 0.5–2 mm, a profiled blowpipe head is utilized having a diameter of 150–250 mm, wherein during the drawing step the pressure in the interior of the thus-forming glass tube is maintained in a range of between 0.5–10 mbar, and wherein the viscosity and pressure values throughput rate in the range of 100–400 kg/h, are related to one another to produce a desired profile with a desired sharpness of contour.

4. Apparatus for continuously drawing glass tubes the apparatus comprising:
- a blowpipe having a round barrel portion over a selected portion of its length and a profiled blowpipe head at one end thereof, the profiled blowpipe head having a length which is at most 10% of the length of the blowpipe and having a greater diameter and larger profile dimensions than those of the profiled glass tubing contoured by the apparatus;
- means mounting the blowpipe for rotation about an axis which extends at an oblique angle with respect to the horizontal direction;
- means for rotating the blowpipe about the axis;
- means for dispensing molten glass on the barrel portion of the blowpipe at a location displaced a substantial distance from the profiled head wherein the molten glass flows over and around the barrel portion as the molten glass flows toward and over the profiled head;
- means for controlling the temperature of the molten glass while the molten glass flows over the blowpipe wherein the viscosity is maintained at the profiled blowpipe head in a range of about $4 \cdot 10^5$ Poise to about $10 \cdot 10^5$ Poise;
- means for applying pressure in excess of atmospheric pressure through the blowpipe into the glass tube forming downstream of the profiled blowpipe head; and
- means for receiving the glass tube as the glass tube solidifies.

5. The apparatus according to claim 4, wherein the profiled blowpipe head has angular grooves and angular blowpipe ridges so that the blowpipe head is stellate in cross-section.

6. The apparatus according to claim 4, wherein the profiled blowpipe head has arcuate grooves and arcuate ridges so that the blowpipe head is wave-like in cross-section.

7. The apparatus according to claim 4, wherein the blowpipe head has grooves and ridges which flare conically in the direction of the axis.

8. The apparatus according to claim 4, wherein the blowpipe head has sides which are concave so as to be pulvinate in cross-section.

9. The apparatus according to claim 4, wherein the blowpipe head has a zone immediately adjoining the barrel portion which zone has a diameter which is substantially larger than the diameter of the barrel portion directly adjoining the profiled zone so as to form a step between the barrel portion and the profiled blowpipe head.

10. The apparatus according to claim 4, wherein the ratio of the length of the barrel portion which surrounded by molten glass to the profiled blowpipe head is in the range of about 30:1 to about 50:1.

11. The apparatus according to claim 4, wherein the length of the zone of the barrel portion of the blowpipe surrounded by the molten glass during operation of the apparatus is in the range of about 750 to about 1500 mm.

12. The apparatus according to claim 4, wherein the diameter of the profiled blowpipe head is in the range of about 50 to about 600 mm.

13. The apparatus of claim 4, wherein the diameter of the profiled blowpipe head is in the range of about 100 to about 400 mm.

14. The apparatus of claim 4, wherein the length of the profiled blowpipe head is in the range of about 1 to about 100 mm.

15. The apparatus according to claim 4, wherein the length of the profiled blowpipe head is in the range of about 5 to about 60 mm.

16. The process according to claim 1, wherein the expanded profiled head portion ha a zone immediately adjoining the round barrel-shaped portion which zone has a diameter which is substantially larger than the diameter of the round barrel-shaped portion directly adjoining the profiled zone so that the molten glass tube is drawn over a step from the round barrel-shaped portion to the expanded profiled head portion.

17. The apparatus of claim 4, wherein the blowpipe is tapered toward the profiled blowpipe head.

* * * * *